Mar. 3, 1925.  1,528,007

C. F. CROMMETT
APPARATUS FOR PRODUCING CARBON BLACK
Filed Nov. 1, 1922  2 Sheets-Sheet 1

Inventor.
Charles F. Crommett
by Heard Smith & Tennant.
Attys

Mar. 3, 1925.

C. F. CROMMETT 1,528,007

APPARATUS FOR PRODUCING CARBON BLACK

Filed Nov. 1, 1922    2 Sheets-Sheet 2

Inventor.
Charles F. Crommett
by Heard Smith & Tennant.
Attys.

Patented Mar. 3, 1925.

1,528,007

UNITED STATES PATENT OFFICE.

CHARLES F. CROMMETT, OF CHELSEA, MASSACHUSETTS, ASSIGNOR OF ONE-THIRD TO WILFORD J. HAWKINS, OF NEW YORK, N. Y., AND ONE-THIRD TO LOUIS N. WHEELOCK, OF BOSTON, MASSACHUSETTS.

APPARATUS FOR PRODUCING CARBON BLACK.

Application filed November 1, 1922. Serial No. 598,304.

*To all whom it may concern:*

Be it known that I, CHARLES F. CROMMETT, a citizen of the United States, and resident of Chelsea, county of Suffolk, State of Massachusetts, have invented an Improvement in Apparatus for Producing Carbon Black, of which the following description, in connection with the accompanying drawing, is a specification, like characters on the drawing representing like parts.

This invention relates to an apparatus for producing carbon-black by the decomposition of a hydrocarbon or hydrocarbon mixture into its constituent elements of carbon and hydrogen.

One of the objects of the invention is to provide a novel apparatus for this purpose which is highly efficient in operation and is capable of an output much greater than that obtained in the apparatus for this purpose now commonly used.

Another object of the invention is to provide an apparatus of that type in which the hydrocarbon is separated into its constituent elements by the application of heat, and in which the dissociation of the carbon and hydrogen is effected in such a way that the carbon will not be agglomerated but will remain as a finely divided powder.

Still another object of the invention is to provide a novel apparatus of this type in which a catalyzer is employed to reduce the temperature of dissociation.

Other objects of the invention will be pointed out in the following description.

My invention is specially advantageous when used in decomposing a hydrocarbon or hydrocarbon mixture of the methane series, such for instance as, methane, ethane, propane, butane, etc., and may also be advantageously used in treating any one of the above-mentioned hydrocarbons or a hydrocarbon compound containing a mixture of such hydrocarbons.

The reaction involved in decomposing hydrocarbon into carbon and hydrogen is an endothermic reaction, that is, a reaction which involves the absorption of heat. The reaction involved in decomposing methane may be expressed as follows: $CH_4 \rightarrow C + 2H_2$ $-21,500$ cals. In regard to the decomposition of ethane, propane and butane, it is probable that these hydrocarbons do not decompose directly into carbon and hydrogen when subjected to the action of heat, but are first decomposed into methane which in turn breaks down into carbon and hydrogen according to the above formula.

Where the decomposition of a hydrocarbon into carbon and hydrogen by the action of heat is acocmplished by bringing the hydrocarbon into contact with a heated surface, and especially where the heated surface has a catalyzing effect, experiments tend to show that the reaction is a surface reaction, that is to say, the film of gas which comes in contact with the heated surface is decomposed before any decomposition takes place in the gas which is separated from the surface.

In carrying out the process of decomposing hydrocarbon by the action of heat it is, therefore, desirable to bring as much as possible of the gas into contact with the heated surface and my apparatus provides a construction by which a maximum amount of the gas to be decomposed is brought into contact with the heated surface thus facilitating greatly the decomposing operation.

As the gas which is in engagement with the heated surface decomposes the carbon will be deposited on said surface and the accumulation of a film of carbon on said surface will tend to retard the dissociation of the carbon and hydrogen.

Another feature of my invention, therefore, relates to an apparatus having provision for removing the carbon from the heated surface as fast as it is accumulated. This not only keeps the surface clean but it also prevents the deposit of carbon from agglomerating so that the carbon will remain in the form of finely divided powder.

In order to give an understanding of my invention I have illustrated in the drawings a selected embodiment thereof which will now be described after which the novel features will be pointed out in the appended claims.

Figure 1:
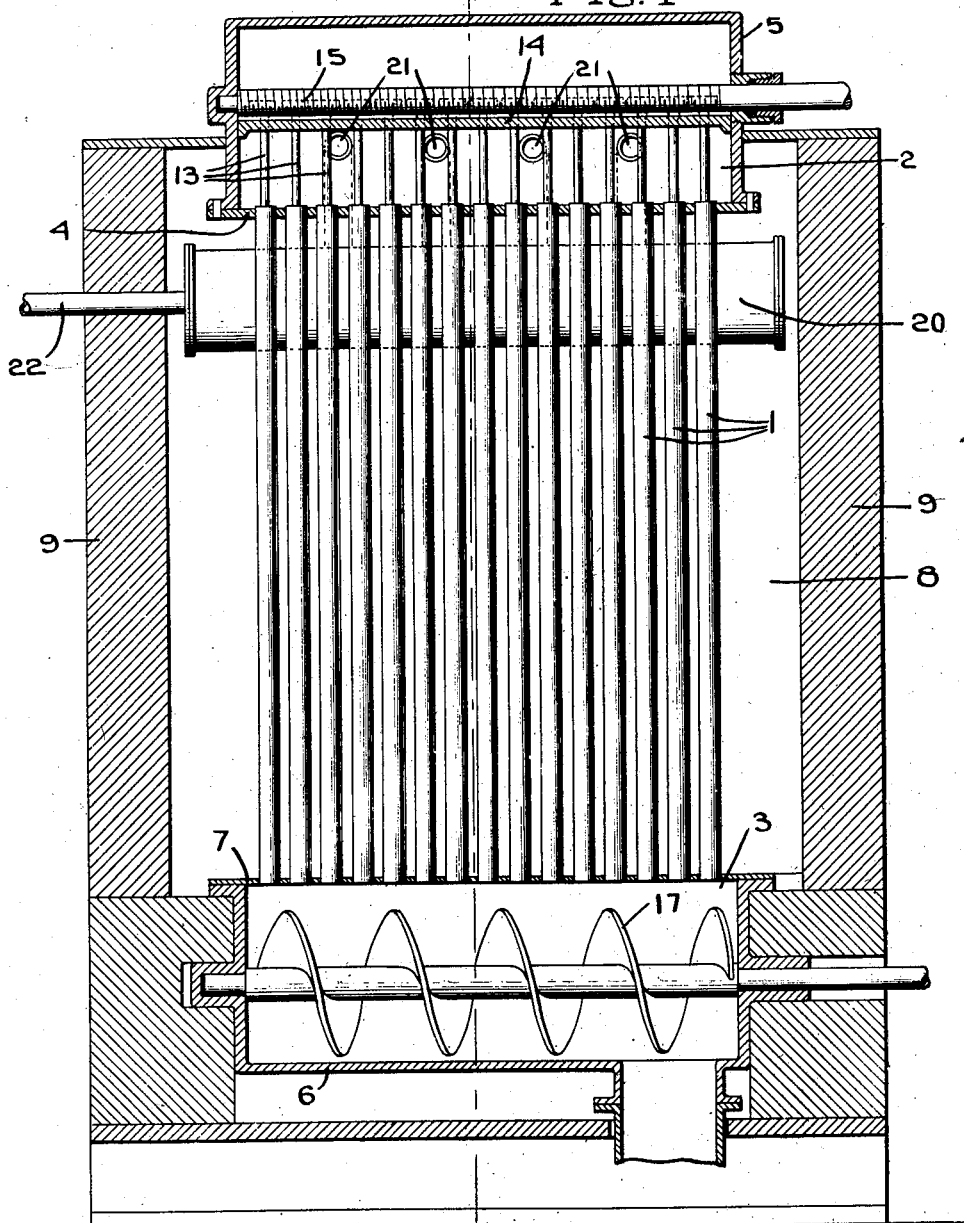
Fig. 1 is a vertical sectional view of an apparatus embodying my invention taken substantially on the line 1—1, Fig. 2.
Figure 3:
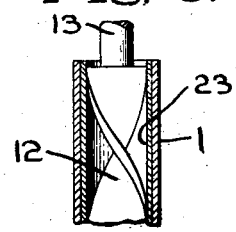
Fig. 3 is an enlarged sectional view through one of the retorts.
Figure 2:
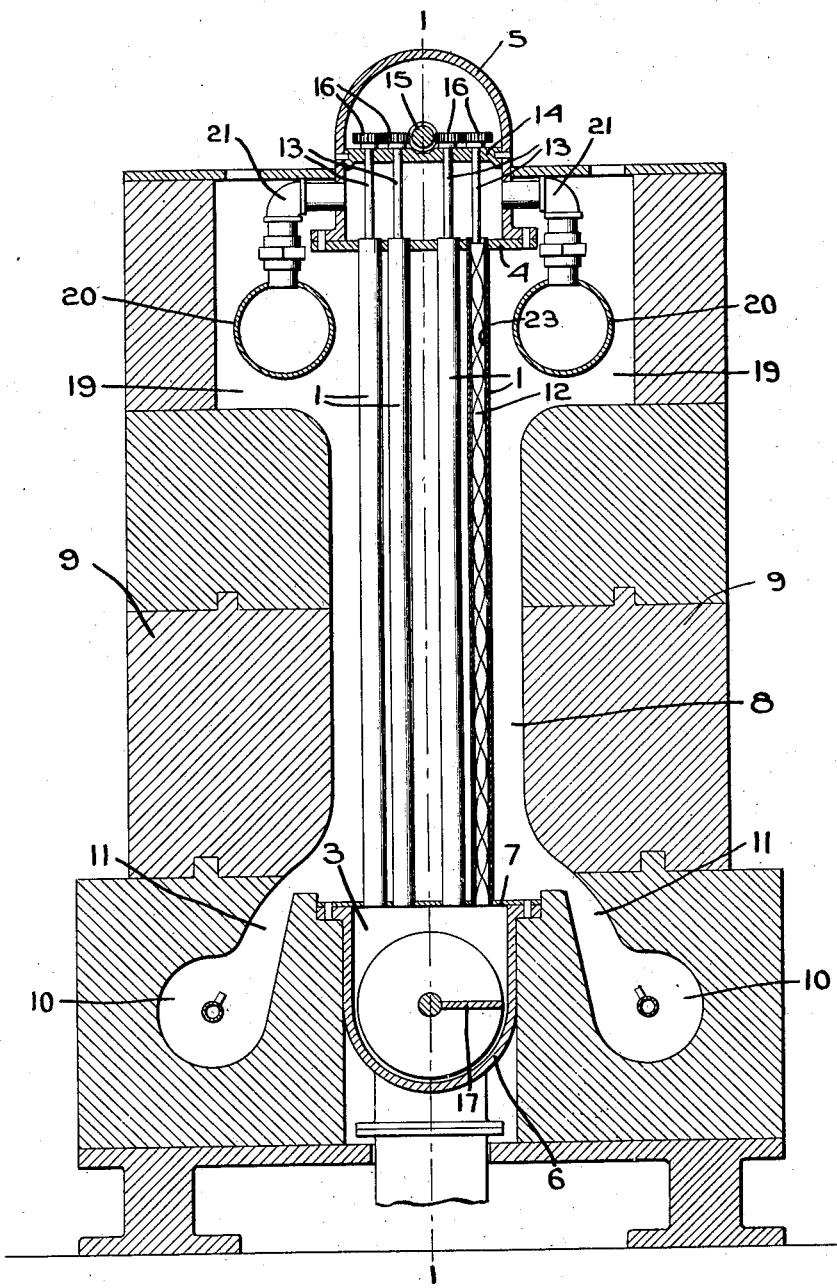
Fig. 2 is a view taken on substantially the line 2—2, Fig. 1.

The apparatus herein illustrated comprises one or more chambers or retorts into which the hydrocarbon or hydrocarbon mixture is continuously delivered, means to heat the retort sufficiently to cause the hydrocarbon which contacts with the walls thereof to decompose into carbon and hydrogen and means to remove the carbon deposit from the walls as fast as it is formed. The device also involves means for agitating the hydrocarbon gas while in the chamber to cause a maximum quantity thereof to be brought into contact with the heated walls.

In order to produce a highly efficient apparatus I propose to make the chambers or retorts of relatively small diameter and of considerable length and to deliver the hydrocarbon mixture to the end thereof.

I also propose to incorporate in one furnace or apparatus a plurality of these chambers or retorts thereby to increase the output and also the efficiency. In the apparatus herein illustrated these chambers or retorts are indicated at 1 and are in the nature of tubes arranged vertically and communicating at their upper ends with a chamber 2 in the form of an intake manifold and at their lower ends with another chamber 3 into which the carbon and hydrogen gas is delivered.

The upper ends of the tubes 1 are secured in a plate 4 forming the bottom of the chamber 2 and this plate is secured to an elongated casing or hood 5 within which the chamber 2 is situated. The delivery chamber 3 is shown as formed from a trough-shaped member 6 having a plate 7 secured to its upper side and in which the lower ends of the tubes 1 are anchored.

Means are provided for heating the tubes 1 and for this purpose they are located in a heating chamber 8, which is enclosed by fire brick walls 9 and which may be heated by any suitable means. I have herein illustrated two combustion chambers 10 situated either side of the delivery chamber 3 and in which gas or any other suitable combustible capable of developing high heat may be burned. The heat from the combustion chamber passes to the heating chamber 8 through passages 11 which extend the length of the furnace.

Any desired number of tubes 1 may be employed and in the construction herein shown there are four rows or banks of tubes, each extending from one end to the other of the apparatus.

The gas to be treated is introduced into the chamber 2 and from the chamber 2 it passes downwardly through the tubes 1 and as the gas comes in contact with the heated walls of the tubes 1 it decomposes into carbon and hydrogen, the carbon becoming deposited on the walls and the hydrogen passing downwardly into the chamber 3 from which it is withdrawn for further use.

In order to increase the efficiency of the apparatus I have provided within each tube 1 means for agitating the hydrocarbon gas thereby bringing as great a quantity as possible thereof in contact with the heated walls of the tube, and I have also provided means for removing the carbon deposit from the walls of the tube 1 as fast as it is formed. While any suitable means for accomplishing this may be employed I find good results can be obtained by employing a scraper element 12 extending the length of each tube 1 and having the form of a ribbon spirally twisted. This scraper is arranged to be rotated within the tube and is of such a size that the edges thereof engage the walls of the tube. The rotation of the scraper not only scrapes the walls and thus cleans the carbon deposit therefrom as fast as it is formed but it also agitates the hydrocarbon gas and brings a maximum quantity thereof in contact with the walls.

These scraper elements 12 may be rotated in any suitable way. I have herein shown each element as secured to a shaft 13 which extends through the chamber 1 and through the plate 14 constituting the top of the chamber and which is in the nature of a partition extending across the hood 5. The shafts 13 are driven from a driving shaft 15 extending longitudinally of the hood 5 and situated above the partition 14. The form of gearing employed between the shaft 15 and the shaft 13 will depend somewhat on the arrangement of the shafts 13. In the construction shown the tubes 1 and shafts 13 are arranged to form transverse rows of four each, there being two tubes 1 and shafts 13 in each row of each side of the shaft 15. The two shafts 13 at each end of each transverse row are geared to the shaft 15. Spiral gears may be conveniently employed for this purpose. With this arrangement all of the scrapers 12 are driven from the same shaft 15.

Situated in the delivery chamber 3 is means for removing the carbon therefrom. This means is herein shown in the form of a screw conveyer 17 which operates to feed the carbon deposit to the outlet opening 18 through which it is discharged into a suitable receptacle.

In order to increase the efficiency of the device I propose to preheat the gas before it is delivered to the chamber 2 and this preheating is herein done by means of the hot gases which are delivered from the heating chamber 8 after they have been utilized to heat the tubes 1.

The heating chamber 8 is shown as enlarged slightly at its upper end as shown at 19 and situated in this portion 19 are two preheating chambers 20 which extend the length of the furnace and which are connected to the chamber 2 through suitable pipes 21. The gas to be treated is delivered to the preheating chambers 20 through suitable pipes 22 and after being preheated therein it is delivered to the chamber 2.

In order to lower the temperature which is necessary to decompose the hydrocarbon gas I provide means whereby the gas is heated in the presence of a catalyzing agent. This can conveniently be done by providing the tubes 1 with a lining having a catalytic effect or by making the scraper 12 of material which functions as a catalyzer. I find that material such as nickel, cobalt, palladium, etc., have marked catalyzing effects and that when hydrocarbon is heated in the presence of either of these metals the temperature at which the hydrogen and carbon dissociate is materially reduced.

In the drawings I have illustrated the tube 1 as provided with a lining 23 of some catalyzing agent, such for instance as nickel, cobalt or palladium. The use of such catalyzer not only lowers the temperature at which the dissociation will take place but also is an element which increases the efficiency of the apparatus.

It will be observed from the above that the apparatus provides means for decomposing a hydrocarbon mixture by the action of heat and for quickly and continuously removing the carbon deposit as fast as it is formed from the heated zone to a cooler receptacle. This is highly advantageous because it prevents the carbon deposit from agglomerating as would be the case if said deposit remained in the heating zone for any considerable length of time.

The method involved in reducing the temperature of dissociation of the carbon and hydrogen by subjecting the hydrocarbon to the action of heat in the presence of a catalyzer is claimed in my co-pending application Serial No. 563,385, filed May 24, 1922.

I claim.

1. In an apparatus for forming carbon-black, the combination with means to cause a continuous decomposition of a hydrocarbon or hydrocarbon mixture into carbon and hydrogen and the continuous deposit of the carbon on a collecting surface, and means for mechanically removing the carbon from said surface as rapidly as it is deposited and without affecting the continuous decomposing of the hydrocarbon.

2. In an apparatus of the class described, the combination with a chamber, of means to deliver a hydrocarbon mixture thereto, means to heat the chamber thereby to decompose said hydrocarbon into carbon and hydrogen, the carbon collecting on the walls of said chamber, and means to remove the carbon from the chamber as fast as it is formed and without interfering with the continuous decomposition of the hydrocarbon.

3. In a device of the class described, the combination with a chamber having its interior walls formed of material having a catalyzing effect, of means to deliver a hydrocarbon mixture thereto, a relatively cool collecting chamber, and means to remove the carbon as fast as it is formed from the first-named chamber and deliver it to the collecting chamber.

4. In an apparatus of the class described, the combination with a tubular chamber, of means to deliver hydrocarbon thereto at one end, means to heat the chamber sufficiently to cause decomposition of the hydrocarbon which contacts with the walls of the chamber, and a rotary scraper within the chamber, said scraper rotating continuously about the axis of the chamber and scraping the walls thereof and removing the carbon deposit as fast as it is formed.

5. In an apparatus of the class described, the combination with a vertically-arranged tubular member, of means to introduce hydrocarbon to the upper end thereof, means to heat the chamber, and a scraper within the chamber and rotatable about the axis thereof for agitating the hydrocarbon and scraping the walls thereof.

6. In an apparatus of the class described, the combination with a plurality of vertically-arranged tubular chambers, of means to introduce hydrocarbon gas to said chambers at their upper ends, means to heat the chambers sufficiently to cause decomposition of the hydrocarbon gas therein, a collecting chamber communicating with the lower ends of each of the tubular chambers, and means to remove the carbon deposit from the walls of the chambers as fast as it is formed and deliver it to the collecting chamber.

7. In an apparatus of the class described, the combination with a plurality of vertically-arranged tubular members, of means to introduce hydrocarbon gas to said chambers at their upper ends, means to heat the chambers sufficiently to cause decomposition of the hydrocarbon gas therein, a collecting chamber communicating with the lower ends of each of the tubular chambers, and means to remove the carbon deposit from the walls of the chambers as fast as it is formed and deliver it to the collecting chamber, said means also operating to agitate the gas in the chamber.

8. In an apparatus of the class described, the combination with a plurality of vertically-arranged tubular members, of means to introduce hydrocarbon gas to said chambers at their upper ends, means to heat the chambers sufficiently to cause decomposition of the hydrocarbon gas therein, a collecting chamber communicating with the lower ends of each of the tubular chambers, and means to remove the carbon deposit from the walls of the chambers as fast as it is formed and deliver it to the collecting chamber, said means also operating to agitate the gas in the chamber, said collecting chamber having a discharge opening and a screw conveyer to feed the carbon to said opening.

9. In a device of the class described, the combination with a tubular chamber having its interior walls formed of material having a catalyzing effect, of means to introduce hydrocarbon gas to one end of said chamber, means to heat said chamber, and means to agitate the gas within the chamber.

10. In a device of the class described, the combination with a tubular chamber having its interior walls formed of material having a catalyzing effect, of means to introduce hydrocarbon gas to one end of said chamber, means to heat said chamber, means to remove the carbon deposit as fast as it is formed from the walls of the chamber.

In testimony whereof, I have signed my name to this specification.

CHARLES F. CROMMETT.